No. 868,906. PATENTED OCT. 22, 1907.
J. F. COLE.
COURSE PROTRACTOR.
APPLICATION FILED JUNE 21, 1907.
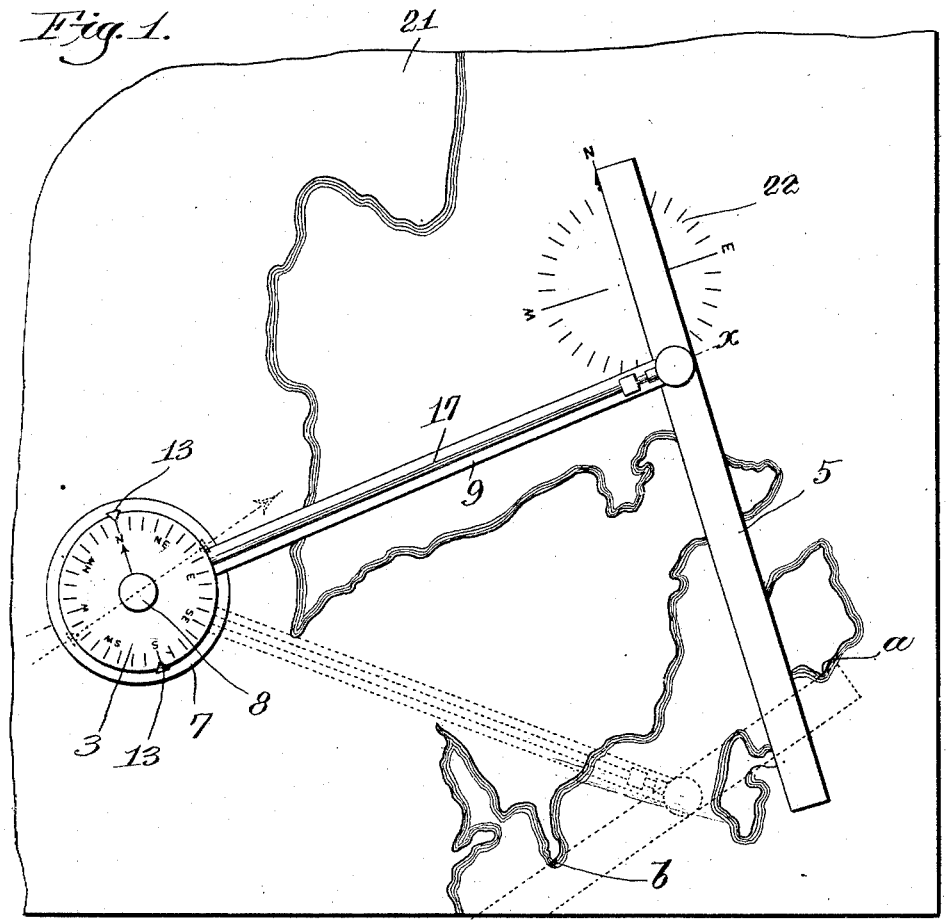
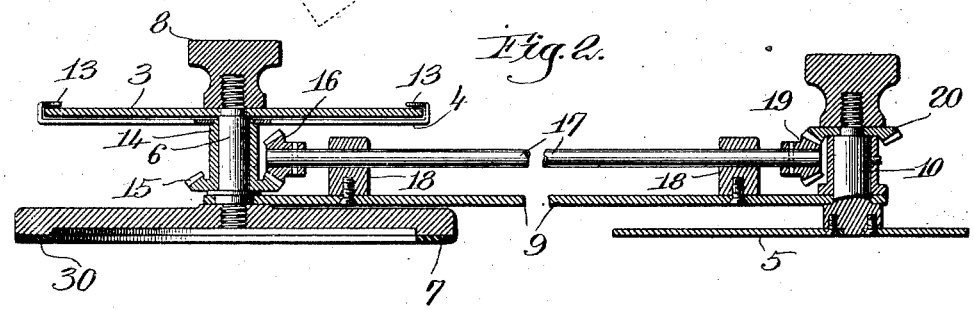
Witnesses:
Thomas J. Drummond
Joseph M. Ward
Inventor:
John F. Cole,
by Beverly Gregory
Attys.

UNITED STATES PATENT OFFICE.

JOHN F. COLE, OF SOMERVILLE, MASSACHUSETTS.

COURSE-PROTRACTOR.

No. 868,906.  Specification of Letters Patent.  Patented Oct. 22, 1907.

Application filed June 21, 1907. Serial No. 380,060.

*To all whom it may concern:*

Be it known that I, JOHN F. COLE, a citizen of the United States, and a resident of Somerville, in the county of Middlesex and State of Massachusetts, have invented an Improvement in Course-Protractors, of which the following description, in connection with the accompanying drawing, is a specification, like letters on the drawing representing like parts.

This invention relates to a device for indicating from a chart the direction of one point from another, and it has been especially designed to enable mariners to determine from a chart the direction in which they should sail to reach any desired point. Or in other words to indicate to the mariner the direction of the desired course. Hence I have chosen to term the device a course protractor.

My improved device comprises a compass member having the points of the compass marked thereon, an indicator or pointer coöperating with said member, a course-indicating member which is adapted to be placed on the chart so as to pass through the places on the chart between which it is desired to sail, and operative connections between said course-indicating member and the indicator so that when the compass member has been properly set the indicator will at all times indicate the direction of the course-indicating member in whatever position it may be placed, so that when it is placed in the chart to extend between any predetermined points, said indicator will indicate on the compass member the direction between said points.

I will first describe one embodiment of my invention and then point out the novel features thereof in the accompanying claims.

In the drawings, Figure 1 is a plan view of the device showing a portion of the chart and also showing the method of using the device; Fig. 2 is a section on the line *x*, Fig. 1.

In the present embodiment of the invention the essential elements of the device are the compass member 3, herein shown in the form of a disk which has marked on its upper face the points of the compass, the pointer 4 movable with relation to the compass member 3 and the course-indicating member 5 which is operatively connected to the pointer in such a way that when the compass member is properly set said pointer will indicate on the compass member the direction at all times of the course-indicating member.

I have herein shown the compass member 3 as mounted on a stud 6 rising from a base 7, said compass member being held on the stud by a suitable nut 8. Extending from the stud 6 and pivotally mounted thereon is a radius arm 9 which has pivoted thereto at its outer end a stud 10 to which the course-indicating member 5 is rigidly secured.

The pointer 4 is mounted to turn about the stud 6 as an axis, said pointer being herein shown as situated beneath the compass member 3, and as having the end or ends 13 thereof bent up over the edge of the compass member 3 to constitute a pointer.

The pointer 4 and the indicating member 5 are connected together so that they move in unison, and to secure this end I have shown said pointer as rigid with the sleeve 14 which is loosely mounted on the stud 6 and which has formed therewith a bevel gear 15 that meshes with a bevel gear 16 fast on a shaft 17 that extends longitudinally of the radius arm and is supported in suitable bearings 18 thereon. The outer end of the shaft 17 has fast thereto a bevel gear 19 which meshes with a bevel gear 20 fast on the stud 10. The gear 16 is situated above the gear 15 and the gear 19 below the gear 20 so that the course-indicating member 5 and said gears have such a relation to each other that the course-indicating member 5 and the pointer 4 will move in unison and in the same direction.

In using my improved device to determine the direction of the course between any two predetermined points, said device is placed on a chart 21 in such a position that by movement of the radius arm 9 the course-indicating member 5 can be brought over the compass rose 22 which is printed on the chart. Said course-indicating member 5 is arranged directly north and south by said compass rose, and then the base 7 carrying the compass member 3 is turned so that the compass-marks on said compass member will correspond in direction to those of the compass rose, this being done by simply turning the base 7 with the compass member 3 until the pointer 4 coincides with the "North" mark on the compass. The instrument is now properly adjusted and may be used to determine the course between any two points, such for instance as the points *a* and *b* on the chart by simply swinging the radius arm until one or the other edge of the course-indicating member can be brought in line with the two points *a*, *b*, as shown in dotted lines Fig. 1.

Since the pointer 4 follows the movement of the course-indicating member 5 the said pointer will indicate on the compass member 3 the correct direction between the points *a*, *b*, as shown in dotted lines, and thus the operator can by merely reading the compass member determine which direction to sail to follow the course *a*, *b*. The pointer 4 is made double, that is, with two points, as shown, so that it will indicate the direction both ways. If desired I may provide the base 7 with a ring 30 of rubber or other frictional material which will prevent said base from being easily thrown out of proper position by slipping on the chart.

This device is a very simple instrument for accurately determining the direction between any two points, and while it has been especially designed for mariners' use yet it will be obvious that it may be used for determining the direction between any two points on a chart.

I have not shown herein all embodiments of my invention, but have illustrated the preferred embodiment only.

Having described my invention, what I claim as new and desire to secure by Letters Patent is:—

1. In a course protractor, the combination with a compass member, of a course-indicating member pivoted independently of the compass member, and means to indicate on the compass member the direction of the course-indicating member in any position thereof.

2. In a course protractor, the combination with a compass member, of an indicator or pointer coöperating therewith, a course-indicating member, and operative connections between said course-indicating member and the pointer whereby said pointer moves in unison with the course-indicating member.

3. In a course protractor, the combination with a compass member, of a radius arm extending therefrom, a pointer coöperating with said compass member, a course-indicating member pivotally carried by said arm, and operative connections between said course-indicating member and said pointer to cause them to move in unison.

4. In a course protractor, the combination with a compass member, of a pivoted pointer coöperating therewith, an independently-pivoted course-indicating member, and operative connections between said course-indicating member and said pointer whereby said member and pointer move in unison.

5. In a course protractor, the combination with a compass member, of an indicator or pointer coöperating therewith, a course-indicating member, said pointer and course-indicating member being pivoted to turn about different centers, and operative connections between said pointer and course-indicating member to cause them to turn in unison.

6. In a course protractor, the combination with an arm, of a compass member rotatably carried by one end thereof, a pointer coöperating with said compass member, a course-indicating member pivotally carried by the other end of said arm, and operative connections between said course-indicating member and said pointer to cause them to turn in unison.

In testimony whereof, I have signed my name to this specification, in the presence of two subscribing witnesses.

JOHN F. COLE.

Witnesses:
 MARGARET A. DUNN,
 W. C. LUNSFORD.